United States Patent [19]

Fujita et al.

[11] Patent Number: 5,061,071
[45] Date of Patent: Oct. 29, 1991

[54] METHOD AND APPARATUS FOR DETECTING SURFACE CONDITION BY UTILIZING OPTICAL HETERODYNE INTERFERENCE

[75] Inventors: Kazuhiko Fujita, Nagoya; Yoshinori Bessho, Mie, both of Japan

[73] Assignee: Brother Kogyo Kabushiki Kaisha, Aichi, Japan

[21] Appl. No.: 453,964

[22] Filed: Dec. 20, 1989

[30] Foreign Application Priority Data

Dec. 26, 1988 [JP] Japan .................. 63-328507

[51] Int. Cl.$^5$ .............................. G01B 9/02
[52] U.S. Cl. .................... 356/360; 356/349; 356/358; 250/201.4
[58] Field of Search ............ 356/349, 358, 360; 250/561, 201.4

[56] References Cited
U.S. PATENT DOCUMENTS 4,848,908 7/1989 Huang .................. 356/349

Primary Examiner—Samuel Turner
Attorney, Agent, or Firm—Oliff & Berridge

[57] ABSTRACT

Method and apparatus for detecting the roughness or undulation of a subject surface, by using a light beam which is converged on the subject surface by an object lens and which is reflected by the subject surface. A relative position between the object lens and the subject surface in the direction parallel to the optical axis of the lens is controlled so that the measuring light reflected by the subject surface has a plane wave. On the other hand, an amount of relative displacement between the object lens and the subject surface is detected, based on a heterodyne interference between a light beam reflected by a stationary mirror and a light beam reflected by a movable mirror which is moved as the relative position is changed. The surface condition is detected based on the amount of relative displacement between the object lens and the subject surface which is detected when said plane wave of said measuring light beam is obtained.

13 Claims, 10 Drawing Sheets

METHOD AND APPARATUS FOR DETECTING SURFACE CONDITION BY UTILIZING OPTICAL HETERODYNE INTERFERENCE

BACKGROUND OF THE INVENTION

1. Field of the Invention

The present invention relates to a method and an apparatus for accurately measuring or detecting the roughness or minute undulation of a surface of a subject, by utilizing optical heterodyne interference, even where the subject surface has a relatively large variation in the height or depth of depressions and projections which define the undulation.

2. Discussion of the Prior Art

There is known an optical apparatus or instrument for measuring, detecting or inspecting the roughness, cross sectional profile or minute undulation of a surface of a subject, by utilizing a heterodyne interference between a reference beat beam having a fixed frequency, and a measuring beat beam whose frequency varies due to changes in the height or depth of the depressions and projections on the subject surface. Namely, a light beam is converged on the subject surface, by an object lens, and is reflected by the subject surface. The reflected light is used as the measuring beat beam whose frequency varies due to a variation in its phase which arises from the height or depth variation of the subject surface. This type of measuring apparatus suffers from a low measuring resolution in the direction parallel to the subject surface, where the measuring spots on the subject surface are not precisely positioned at the focal point of the object lens. Further, the deviation of the subject surface from the focal point of the object lens may cause an measuring error (measured height of projections or depth of depressions being smaller or larger than the actual height or depth), where the height or depth of the projections or depressions is larger than the wavelength of the measuring light beam incident upon the subject surface.

SUMMARY OF THE INVENTION

It is therefore a first object of the present invention to provide a method of measuring or detecting the minute undulation of a subject surface, which assures improved resolution in the direction parallel to the subject surface, and which also assures improved measuring accuracy even where the height or depth variation of projections and depressions defining the undulated subject surface is larger than the wavelength of the measuring beam.

A second object of the invention is to provide an optical heterodyne interference surface measuring apparatus suitably used for practicing the method of the invention.

The first object may be achieved according to one aspect of the present invention, which provides a method of detecting a condition of a surface of a subject by using a light beam which is converged on the surface of the subject by an object lens and which is reflected by the subject surface, comprising the steps of controlling a relative position between the object lens and the subject in a direction parallel to an optical axis of the object lens, so that the light beam reflected by the subject surface has a plane wave, and detecting an amount of relative displacement between the object lens and the subject surface, based on a heterodyne interference between a light beam reflected by a stationary mirror and a light beam reflected by a movable mirror which is moved as the relative position between the object lens and the subject is changed. The condition of the subject surface is detected based on the detected amount of relative displacement of the object lens and the subject surface.

The second object may be achieved according to a second aspect of the invention, which provides an optical heterodyne surface measuring apparatus for detecting a condition of a surface of a subject, by using a light beam which is converged on the surface of the subject by an object lens and which is reflected by the subject surface, comprising: (a) a drive device for changing a relative position between the object lens and the subject in a direction parallel to an optical axis of the object lens; (b) position control means for controlling the drive device for changing the relative position between the object lens and the subject, so that the light beam reflected by the subject surface has a plane wave; and [3] heterodyne measuring means for detecting an amount of relative displacement between the object lens and the subject surface, based on a heterodyne interference between a light beam reflected by a stationary reflecting member and a light beam reflected by a movable reflecting member which is moved as the relative position is changed by the drive device under the control of the position control means. The heterodyne measuring device detects the condition of the subject surface, based on the detected amount of relative displacement between the object lens and the subject surface.

In the method and apparatus of the present invention described above, the relative position between the object lens and the subject in the direction parallel to the optical axis of the object lens is controlled or adjusted so that the light beam reflected by the subject surface has a plane wave, namely, so that the subject surface is accurately aligned with the focal point of the object lens, or with the waist position of the light beam converged by the object lens. In the optical surface measuring or detecting system utilizing a heterodyne interference, the measuring resolution in the direction parallel to the subject surface is the highest when the light beam is accurately converged right on the specific measuring spot on the subject surface. According to the present invention, the relative position between the object lens and the subject is always controlled so as to establish precise alignment of each measuring spot on the subject surface with the focal point of the object lens, irrespective of the varying height or depth of the specific measuring spot which has a depression or projection. When each measuring spot is irradiated by the measuring light beam, the amount of relative displacement between the object lens and the subject surface when the light beam has the plane wave is detected. In other words, the relative displacement necessary to establish the precise alignment of the subject surface with the focal point of the object lens is detected, in order to measure an mount of change in the height or depth of the currently measured spot from that of the last measured spot. Thus, the surface condition (minute undulation defined by the depressions and projections) of the subject can be accurately detected based on the detected relative displacement between the object lens and the subject surface. Since the relative position between the object lens and the subject is always adjusted for alignment of the subject surface with the focal point of the object lens, the present method and apparatus are capable of precisely detecting the surface condition, even where the height or depth variation of the subject surface is larger than the wavelength of the light beam used for the measurement.

BRIEF DESCRIPTION OF THE DRAWINGS

The above and other objects, features and advantages of the present invention will be better understood by reading the following detailed description of presently preferred embodiments of the invention, when considered in connection with the accompanying drawings, in which.

DETAILED DESCRIPTION OF THE PREFERRED EMBODIMENTS

Figure 1:
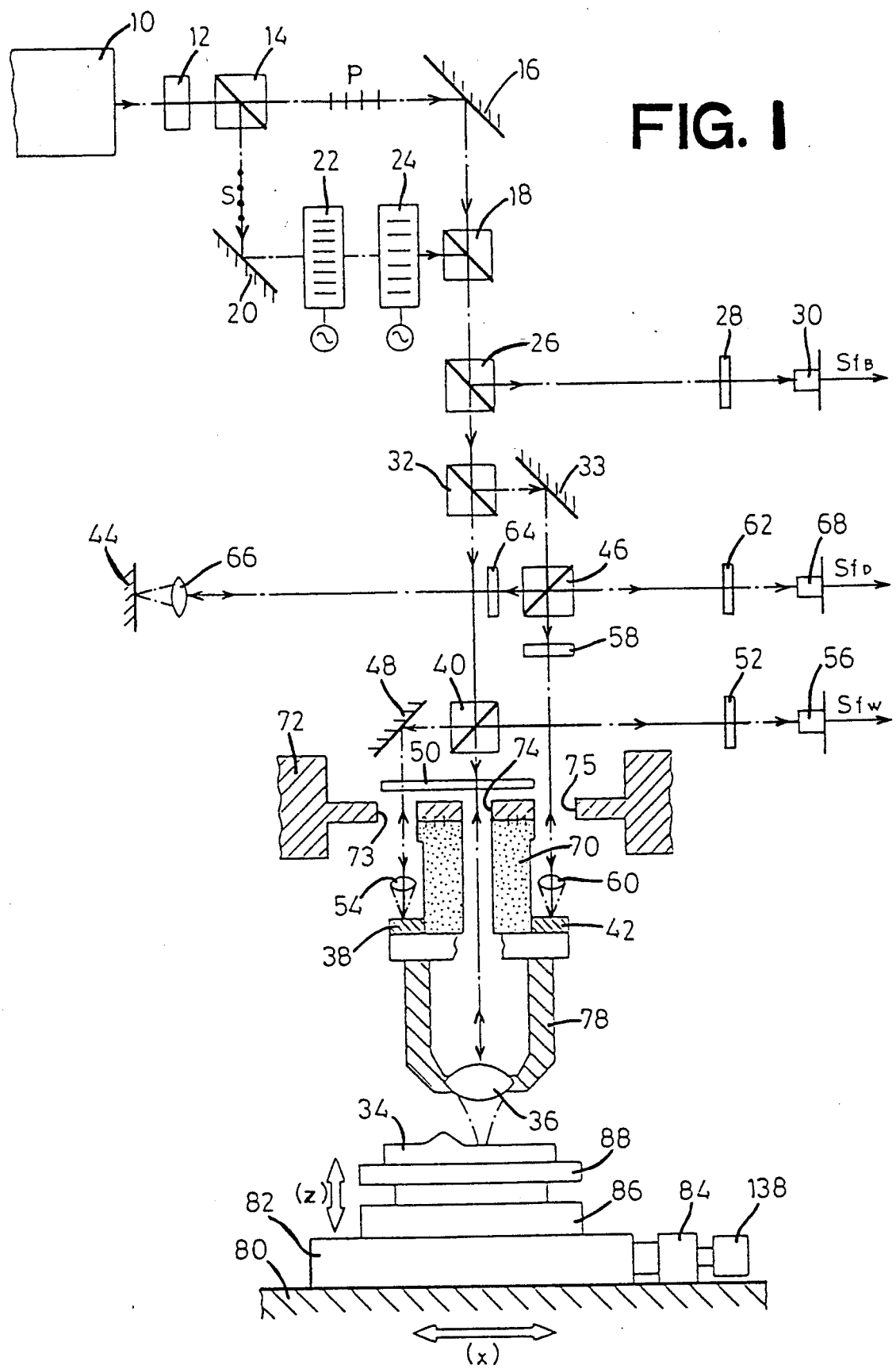
FIG. 1 is a schematic view showing one embodiment of an optical surface measuring or detecting apparatus of the present invention.

Referring first to FIG. 1, there is shown the optical surface measuring or detecting apparatus constructed according to one embodiment of the present invention. In the following description, it is to be understood that the elements are fixed to a frame of the apparatus, unless otherwise specified.

The measuring apparatus has a laser source 10 which produces a linearly polarized laser beam. The laser beam is incident upon a polarizing beam splitter 14 through an optical isolator 12. The incident laser beam is split by the splitter 14 into a P type polarized beam having a plane of polarization parallel to the plane of FIG. 1, and an S type polarized beam having a plane of polarization perpendicular to the plane of FIG. 1. These P type and S type polarized beams are indicated at P and S in FIG. 1. The splitting of the laser beam by the polarizing beam splitter 14 takes place since the plane of polarization of the laser beam produced by the laser source 10 is inclined by 45° with respect to the plane of FIG. 1.

The P type polarized beam transmitted through the beam splitter 14 has a frequency of, which is the frequency of the laser beam as produced by the laser source 10. The P type beam is reflected by a mirror 16 and is transmitted through a polarizing beam splitter 18.

The S type polarized beam transmitted through the beam splitter 14 is reflected by a mirror 20, and is transmitted through a first and a second acousto-optical modulator 22, 24, whereby the frequency of of the S type polarized beam is shifted by +f1 by the first modulator 22 and by −f2 by the second modulator 24. Namely, the frequency of the beam which has been transmitted through the modulator 24 and is incident upon the beam splitter 18 is equal to of +f1 −f2. The P type polarized beam from the mirror 16 and the frequency-shifted S type polarized beam from the second modulator 24 are combined with each other by the beam splitter 18, and the composite beam is split into two beams by a non-polarizing beam splitter 26.

The beam reflected by the non-polarizing beam splitter 26 is transmitted through a polarizer 28 whose axis of polarization is inclined by 45°. Consequently, the beam incident upon the polarizer 28 is changed into a beam which consists of P type and S type components which interfere with each other. The thus obtained beam is referred to as a reference beat beam, which has a reference beat frequency $f_B = |f1-f2|$. This reference beat beam is received by a reference photosensor 30, whereby a reference beam signal $Sf_B$ having the reference beat frequency $f_B$ is produced by the photosensor 30.

The beam transmitted through the non-polarizing beam splitter 26 is split by a non-polarizing beam splitter 32. The light transmitted through the beam splitter 32 will be referred to as a first light beam, while the light reflected by the beam splitter 32 will be referred to as a second light beam.

The first light beam is incident upon a first heterodyne interference optical system which includes a surface (reflecting surface) of a subject 34 to be measured, a movable object lens 36 disposed above the subject 34, a reflecting mirror 38 which is moved with the object lens 36, and a polarizing beam splitter 40 fixedly disposed above the object lens 36.

The second light beam is incident upon a second heterodyne interference optical system which includes a reflecting mirror 42 which is moved with the movable object lens 36, a reflecting mirror 44 (stationary), and a polarizing beam splitter 46.

In the first heterodyne interference optical system, the first light beam which is a composite beam consisting of the P type component having the frequency fo and the S type component having the frequency of $+f1-f2$ is first split by the polarizing beam splitter 40. The P type component transmitted through the beam splitter 40 is transmitted through a ¼ waveplate 50, whereby the transmitted component is converted into a circularly polarized beam. The circularly polarized beam is then converged by the object lens 36, on the surface of the subject 34. The beam reflected by the surface of the subject 34 is transmitted through the object lens 36, and through the ¼ waveplate 50. The beam transmitted through the ¼ waveplate 50 has a plane of polarization which is rotated by 90° with respect to that of the P type component which was incident upon the ¼ waveplate 50 in the direction from the beam splitter 40 toward the object lens 36. Namely, the beam reflected by the subject surface and transmitted through the ¼ waveplate 50 is converted into an S type polarized beam, which is therefore reflected by the polarizing beam splitter 40 toward a polarizer 52.

The beam reflected by the surface of the subject 34 is subjected to a phase shift and scattering, which occurs due to roughness or minute undulation (minute depressions and projections) of the subject surface.

The S type component of the first light beam which is reflected by the polarizing beam splitter 40 is reflected by a stationary mirror 48 and transmitted through the ¼ waveplate 50, whereby the component is converted into a circularly polarized beam. This beam is converged by a converging lens 54, on the surface of the mirror 38. The beam reflected by the mirror 38 is transmitted through the ¼ waveplate 50, whereby the transmitted beam is converted into a P type polarized beam whose plane of polarization is rotated by 90° with respect to that of the S type component which was incident upon the ¼ waveplate 50 in the direction from the mirror 48 toward the mirror 38. The P type polarized beam is reflected by the mirror 48, transmitted through the beam splitter 40, and incident upon the polarizer 52. Since the axis of polarization of the polarizer 52 is inclined by 45° with respect to the polarization planes of the P type and S type polarized beams which are incident upon the polarizer 52, these polarized beams transmitted through the polarizer 52 undergo a heterodyne interference. As a result, a heterodyne interference beat beam is received by a first measuring photosensor 56.

Figure 2:
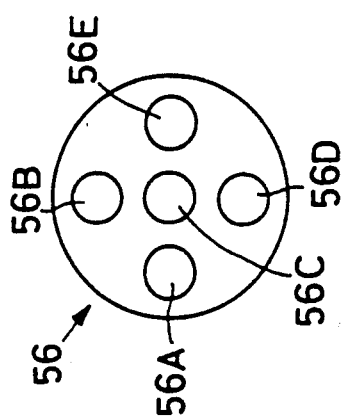
FIG. 2 is a front elevational view of a photo-sensitive surface of a first measuring photosensor of FIG. 1.

The first measuring photosensor 56 has a photo-sensitive surface on which five photo-sensitive elements 56A, 56B, 56C, 56D and 56E are disposed as illustrated in FIG. 2. More specifically, the elements 56A, 56B and 56E are arranged in a horizontal row, while the elements 56B, 56C and 56D are arranged in a vertical row perpendicular to the horizontal row. These five photo-sensitive elements 56A-56E produce respective first measuring beat signals $Sf_{WA}$, $Sf_{WB}$, $Sf_{WC}$, $Sf_{WD}$ and $Sf_{WE}$, whose frequency is $f_W$.

In the second heterodyne interference optical system, the second light beam which is a composite beam consisting of the P type component having the frequency fo and the S type component having the frequency fo $+f1-f2$ is first reflected by a mirror 33 and is then split by the polarizing beam splitter 46. The P type component transmitted through the beam splitter 46 is transmitted through a ¼ waveplate 58, whereby the P type component is through a ¼ waveplat converted into a circularly polarized beam. This circularly polarized beam is converged by a converging lens 60, on the surface of the mirror 42. The beam reflected by the mirror 42 is transmitted through the lens 60, and then through the ¼ waveplate 58. As a result, the beam transmitted through the ¼ waveplate 58 is converted into an S type polarized beam whose plane of polarization is rotated by 90° with respect to the P type component which was incident upon the ¼ waveplate 58 in the direction from the beam splitter 46 toward the converging lens 60. The S type polarized beam is therefore reflected by the beam splitter 46, and is incident upon a polarizer 62.

The S type component of the second light beam which is reflected by the beam splitter 46 is transmitted through a ¼ waveplate 64, and is thereby converted into a circularly polarized beam. This circularly polarized beam is converged by a converging lens 66, on the surface of the mirror 44. The beam reflected by the mirror 44 is transmitted through the lens 66, and through the ¼ waveplate 64. The beam reflected by the mirror 44 is converted by the ¼ waveplate 64, into a P type polarized beam whose plane of polarization is rotated by 90° with respect to that of the S type component which was incident upon the ¼ waveplate 64 in the direction from the beam splitter 46 toward the converging lens 66. Therefore, the P type polarized beam is transmitted through the beam splitter 46 and is incident upon the polarizer 62. Since the axis of polarization of the polarizer 62 is inclined 45° with respect to the polarization planes of the S type and P type polarized beams incident upon the polarizer 62, these polarized beams transmitted through the polarizer 62 undergo a heterodyne interference. As a result, a heterodyne interference beat beam is received by a second measuring photosensor 68. This photosensor 68 produces a second measuring beat signal $Sf_D$ having a frequency $f_D$.

The object lens 36 is adapted to be movable in the direction parallel to the optical axis, by a lens actuator 70. Described in detail, the stationary frame of the apparatus indicated at 72 in FIG. 1 has three apertures 73, 74 and 75 through which the light beams travel toward the mirror 38, object lens 36 and mirror 42, respectively. The lens actuator 70 takes the form of a cylinder secured to the frame 72 such that the cylinder is concentric with the central aperture 74. To the lower end of this cylindrical lens actuator 70, there is fixed a lens holding sleeve 78 which holds the object lens 36 at its lower end. In the present embodiment, the lens actuator 70 is constituted by a cylinder formed of a piezoelectric ceramic material, which is displaced in the axial direction, depending upon a voltage applied to the piezoelectric ceramic material. This piezoelectric lens actuator 70 serves as a drive device for moving the object lens 36, for changing a distance between the object lens 36 and the surface of the subject 34.

The mirrors 38 and 42 are secured to the lens holding sleeve 78, so that these lenses 38, 42 are moved with the object lens 36.

The subject 34 can be positioned in the direction parallel to the optical axis of the object lens 36, and in the direction perpendicular to the optical axis of the lens 36. More specifically, the measuring apparatus is equipped with a positioning device mounted on a base 80. the positioning device includes a horizontally movable table (X-axis table) 82 which is moved by an X-axis drive device 84 in an X-axis direction perpendicular to the optical axis of the object lens 36. The drive device 84 may be a stepping motor or piezoelectric actuator which is capable of accurately positioning the table 82 by moving the table by a relatively short distance. On the horizontally movable table 82, there is mounted a Z-axis drive device 86, which movably supports a vertically movable table (Z-axis table) 88. The table 88 which carries the subject 34 mounted thereon is moved in a Z-axis direction perpendicular to the X-axis direction, by the Z-axis drive device 86. The drive device 86, which may use a stepping motor, is provided to move the subject 34 toward and away from the object lens 36, over a distance which is considerably larger than the distance of movement of the object lens 36 by the lens actuator 70.

The X-axis drive device 84 is provided with an X-axis position sensor 138 for detecting the X-axis position of the horizontally movable table 82. The position sensor 138 may be a rotary encoder, or other known optical position detector.

The present heterodyne interference surface measuring apparatus constructed as described above uses a control system as shown in FIG. 3. The system includes five amplifiers 90A, 90B, 90C, 90D and 90E, which receive the respective first measuring beat signals $Sf_{WA}$, $Sf_{WB}$, $Sf_{WC}$, $Sf_{WD}$ and $Sf_{WE}$ generated by the five photo-sensitive elements 56A, 56B, 56C, 56D and 56E of the first measuring photosensor 56. The first measuring beat signals which are amplified by the amplifiers 90A-90E are received by a waveform monitoring circuit 92.

The waveform monitoring circuit 92 is provided to detect the waveform of the first measuring beat beam which is incident upon the first measuring photosensor 56, that is, to determine whether the first measuring beat beam has a plane wave, or a diverging or converging spherical wave. The waveform monitoring circuit 92 provides an output signal representative of a result of the determination. This output signal is sent to a data bus 102. Further, the circuit 92 produces signals representative of the first measuring beat frequencies $f_W$.

Figure 4:
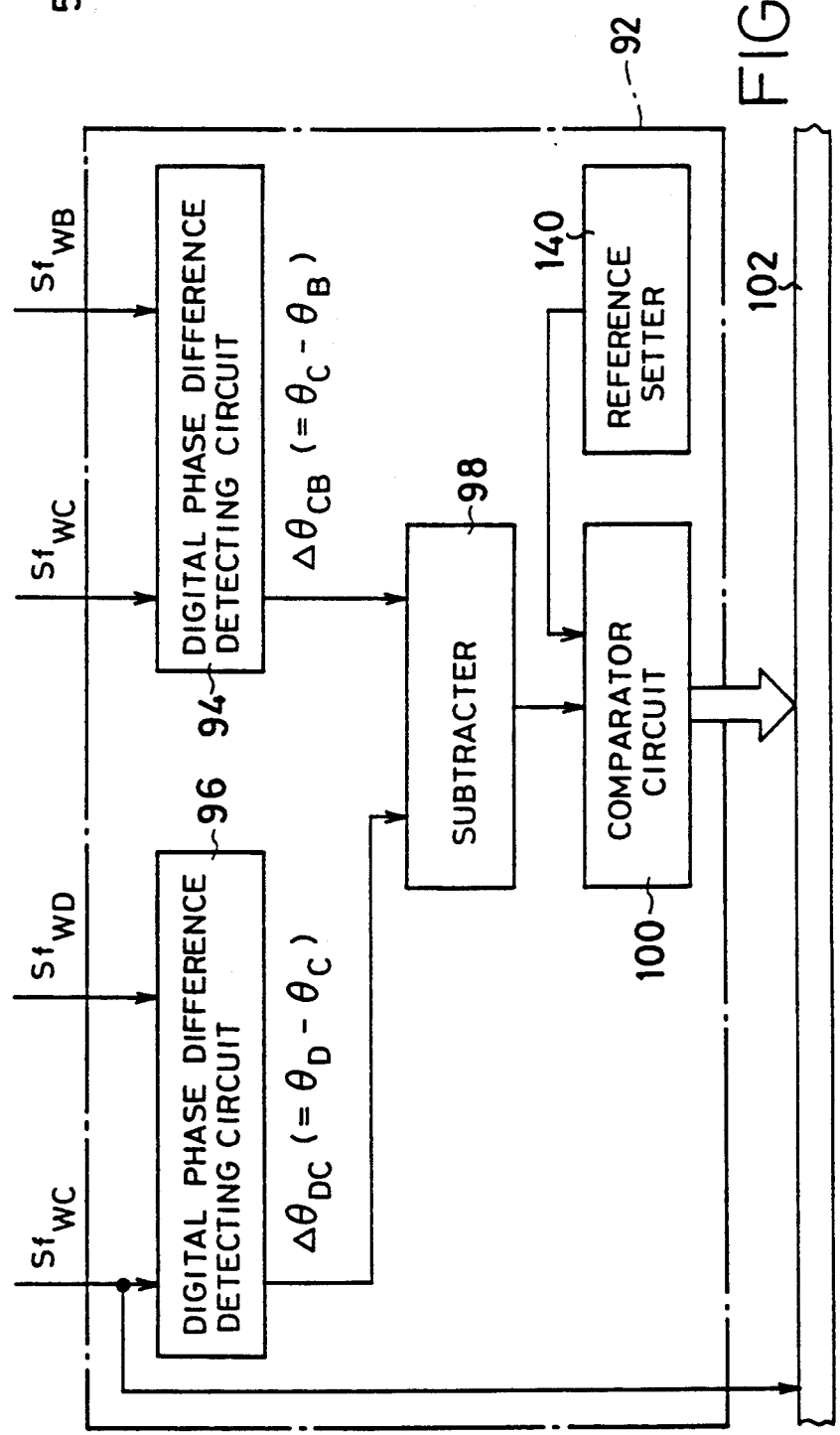
FIG. 4 is a block diagram illustrating in detail a waveform monitoring circuit incorporated in the control system of FIG. 3.

The waveform monitoring circuit 92 may be constructed as shown in FIG. 4. The circuit 92 includes a first digital phase difference detecting circuit 94 which receives the measuring beat signals $Sf_{WB}$ and $Sf_{WC}$ generated by the vertically spaced-apart photo-sensitive elements 56B and 56C, and a second digital phase difference detecting circuit 96 which receives the measuring beat signals $Sf_{WD}$ and $Sf_{WC}$ generated by the vertically spaced-apart photo-sensitive elements 56D and 56C. The first detecting circuit 94 produces an output signal representative of the phase difference $\Delta\theta_{CB}$ ($=\theta_C-\theta_B$, where $\theta_C$: phase angle of the beat signal $Sf_{WC}$ at its peak, and $\theta_B$: phase angle of the beat signal $Sf_{WB}$ at its peak), and this output signal is applied to a subtracter 98. On the other hand, the second detecting circuit 96 produces an output signal representative of the phase difference $\Delta\theta_{DC}$ ($=\theta_D-\theta_C$, where $\theta_D$ phase angle of the beat signal $Sf_{WD}$ at its peak, and $\theta_C$ phase angle of the beat signal $Sf_{WC}$ at its peak), and this output signal is also applied to the subtracter 98. The subtractor 98 subtracts the phase difference $\Delta\theta_{DC}$ from the phase difference $\Delta\theta_{CB}$, and produces an output signal representative of the difference $\Delta\theta_{CB}-\Delta\theta_{DC}$)

Figure 5:
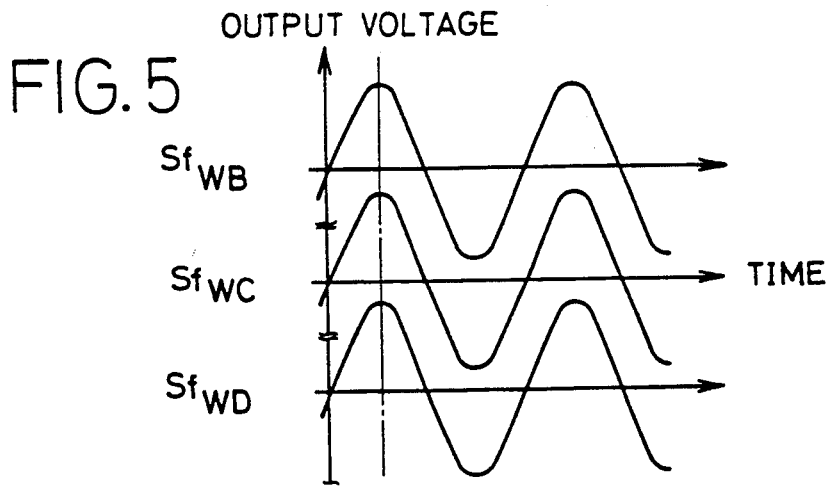
FIGS. 5, 6 and 7 are views for explaining phase differences of three signals generated by corresponding three photo-sensitive elements disposed on the photo-sensitive surface of the first measuring photosensor of FIG. 2, FIG. 5 showing no phase difference, in the case of a plane wave of a light beam incident upon the first measuring photosensor of FIG. 2, FIG. 6 showing a phase difference due to an inclination of the optical axis of the first measuring photosensor, in the case of the plane wave of the incident light beam, and FIG. 7 showing a phase difference due to a converging spherical wave of the incident light beam.
Figure 6:
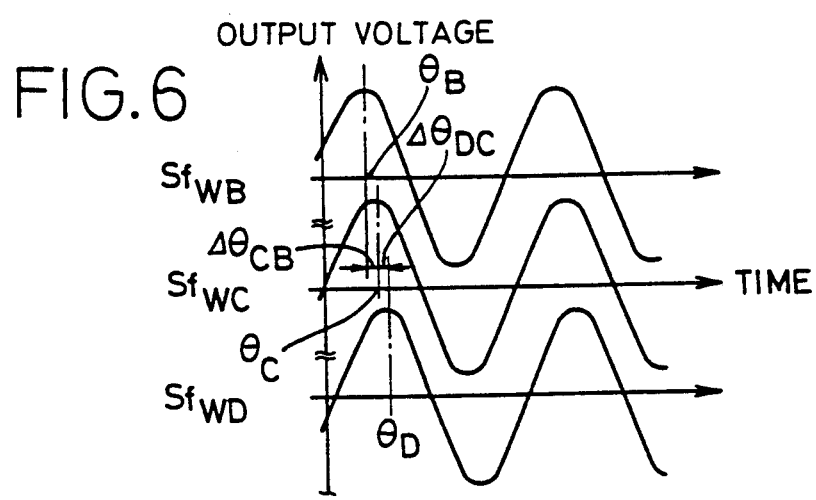

If the first measuring beat beam incident upon the first measuring photosensor 56 has a plane wave, the three measuring beat signals $Sf_{WB}$, $Sf_{WC}$ and $Sf_{WD}$ produced by the appropriate photo-sensitive elements 56B, 56C and 56D have the same phase, as indicated in FIG. 5. Even if the vertical row of the photo-sensitive elements 56B, 56C, 56D is inclined with respect to the vertical, the phases of the beat signals $Sf_{WB}$ and $Sf_{WD}$ of the photo-sensitive elements 56B and 56D above and below the central photo-sensitive element 56C are shifted by the same amount in the opposite directions with respect to the phase of the beat signal $Sf_{WC}$ of the central photo-sensitive element 56C, as indicated in FIG. 6. Namely, the phase differences $\Delta\theta_{CB}$ and $\Delta\theta_{DC}$ are positive or negative values whose absolute values are equal to each other. For example, the phase difference $\Delta\theta_{CB}$ ($\theta_C-\theta_B>0$) of the beat signal $Sf_{WB}$ with respect to the beat signal $Sf_{WC}$ is equal to the phase difference $\Delta\theta_{DC}$ ($\theta_D-\theta_C>0$) of the beat signal $Sf_{WD}$ with respect to the beat signal $Sf_{WC}$.

Figure 7:
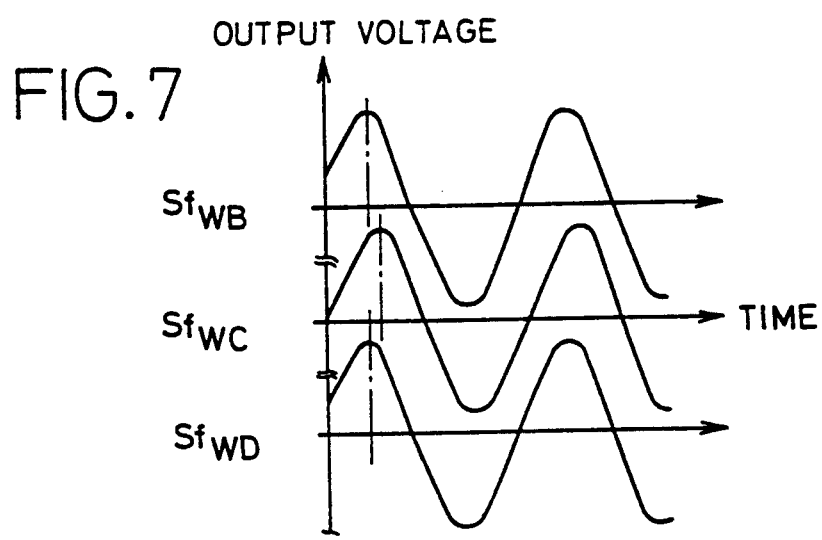

However, if the first measuring beat beam incident upon the first measuring photosensor 56 has a converging spherical wave, the phases of the beat signals $Sf_{WB}$ and $Sf_{WD}$ of the photo-sensitive elements 56B and 56D are both advanced with respect to the phase of the beat signal $Sf_{WC}$ of the central photo-sensitive element 56C, as indicated in FIG. 7. In this case, the phase difference $\Delta\theta_{DC}$ ($=\theta_D-\theta_{\pi C}$) of the beat signal $Sf_{WD}$ with respect to the phase of the beat signal $Sf_{WC}$ is a negative value. On the other hand, if the first measuring beat beam incident upon the photosensor 56 has a diverging spherical wave, the phases of the beat signals $Sf_{WB}$ and $Sf_{WD}$ of the photo-sensitive elements 56B and 56D are both retarded with respect to the phase of the beat signal $Sf_{WC}$ of the central photo-sensitive element 56C. In this case, too, the phase difference $\Delta\theta_{CB}$ ($=\theta_C-\theta_B$) of the beat signal $Sf_{WB}$ with respect to the phase of the beat signal $Sf_{WC}$ is a negative value. Thus, the difference $\Delta\theta_{CB}-\Delta\theta_{DC}$) between the phase difference $\Delta\theta_{CB}$ and the phase difference $\Delta\theta_{DC}$ of the beat signals $Sf_{WB}$ and $Sf_{WD}$ is reduced to zero as the waveform of the beat beam incident upon the photosensor 56 becomes similar to the plane wave.

The output of the subtracter 98 is applied to a comparator circuit 100, which also receives a signal from a reference setter 140. In the comparator circuit 100, the difference $\Delta\theta_{CB}-\Delta\theta_{DC}$) represented by the output of the subtracter 98 is compared with two reference values represented by the signal from the setter 140. The reference values are upper and lower limits which define a reference range including zero (0). If the difference $\Delta\theta_{CB}-\Delta\theta_{DC}$) falls within the reference range, the comparator circuit 100 produces an output signal indicative of the plane wave. If the difference is larger than the upper limit of the reference range, the circuit 100 produces an output signal indicative of the converging spherical wave. If the difference is smaller than the lower limit of the reference range, the circuit 100 produces an output signal indicative of the diverging spherical wave.

The output signal of the comparator circuit 100 which indicates one of the plane wave and the diverging and converging spherical waves (and which may also indicate the curvature of the spherical waves) is sent to the data bus 102. The upper and lower limits of the reference range which are stored in the setter 140 may be equal to the values which are obtained when the waist position BW (See FIG. 8) of the beam incident upon the surface of the subject 34 is offset from the subject surface by a distance equal to or slightly smaller than a half of the wavelength of the beam.

Figure 8:
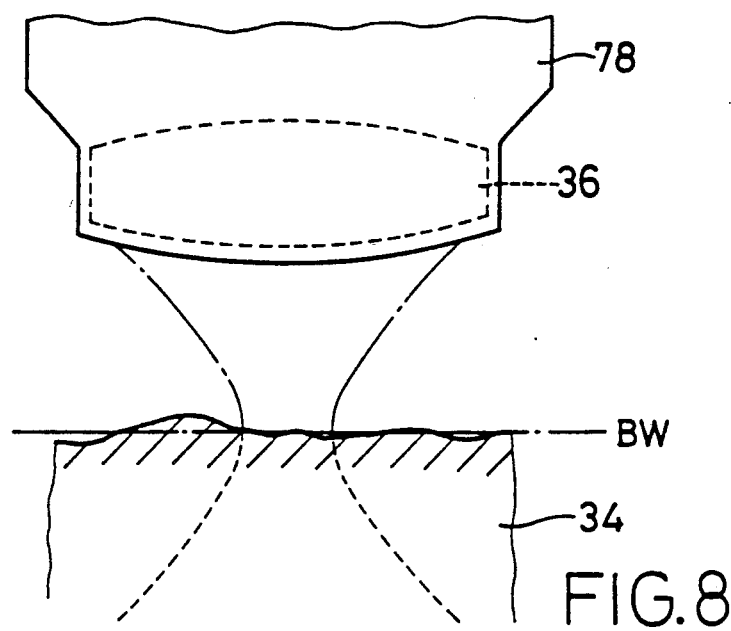
FIG. 8 is an enlarged view showing a relative position between an object lens and a subject to be measured, when the subject surface is aligned with a waist position of a light beam which is converged by the object lens.
Figure 9:
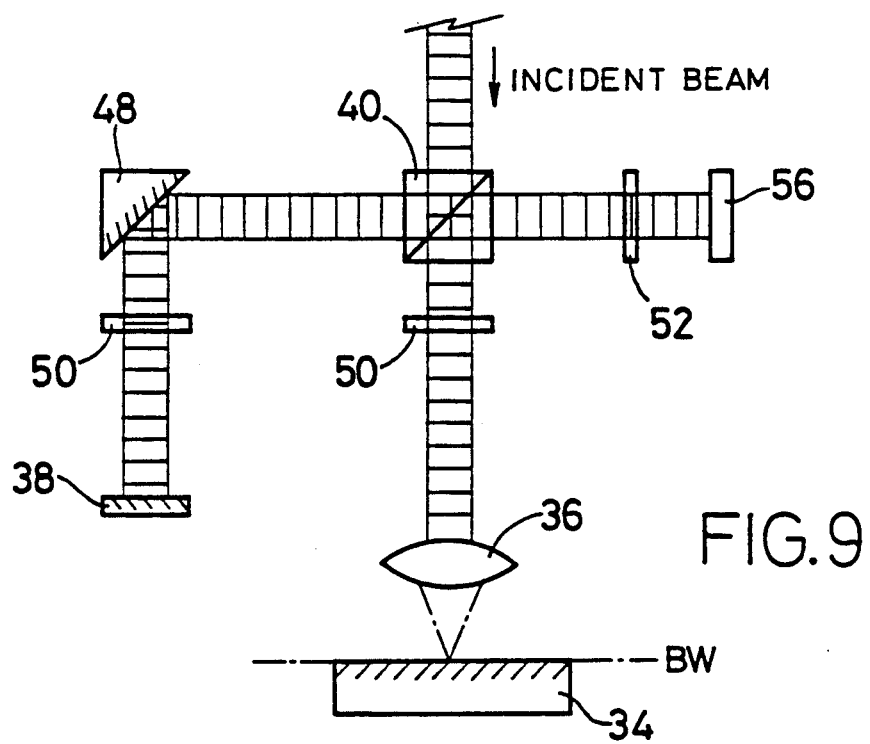
FIG. 9 is a view showing the wave condition of a beam reflected by the subject surface where the subject surface is aligned with the waist position of the beam incident upon the subject surface, as shown in FIG. 8.
Figure 10:
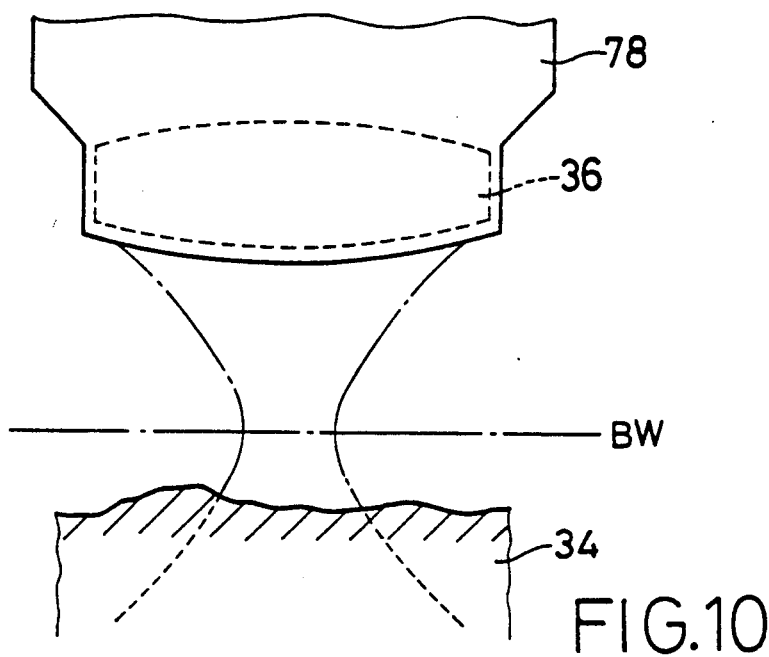
FIG. 10 is a view showing the beam incident upon the subject such that the subject surface is offset from the waist position of the incident beam in the downward direction.
Figure 11:
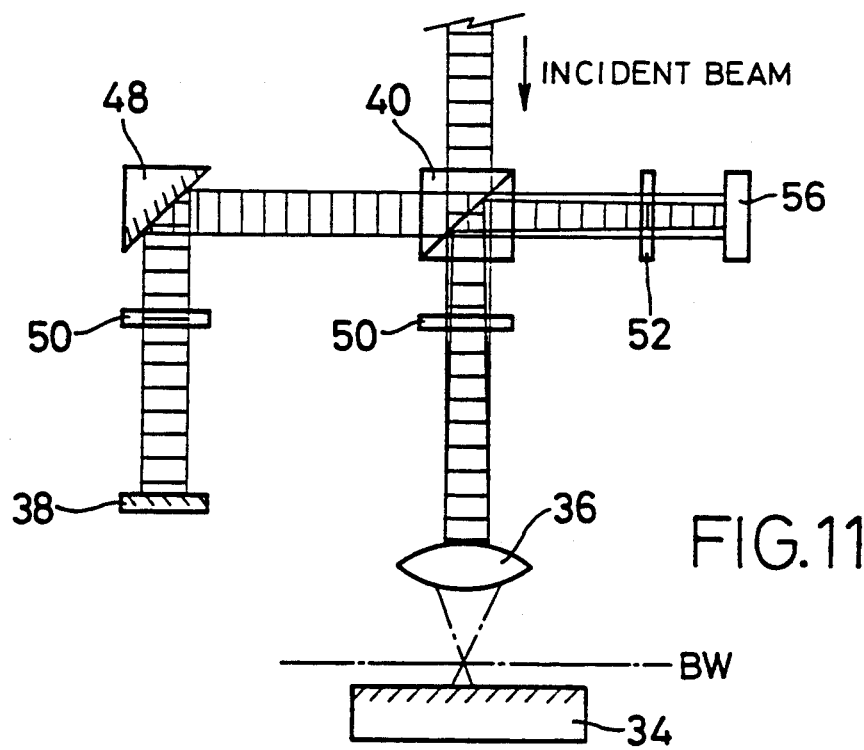
FIG. 11 is a view showing the wave condition of a beam reflected by the subject surface in the case of the incident beam as shown in FIG. 10.
Figure 12:
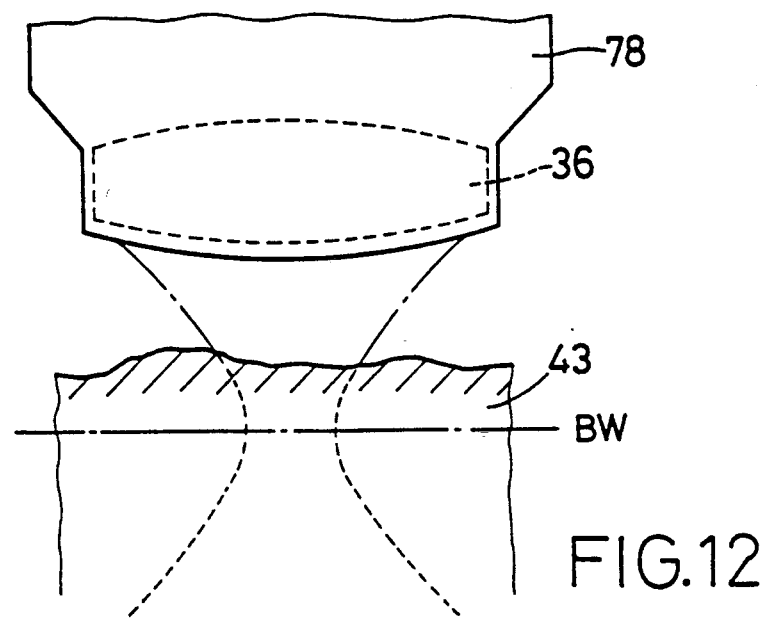
FIG. 12 is a view showing the beam incident upon the subject such that the subject surface is offset from the waist position of the incident beam in the upward direction.
Figure 13:
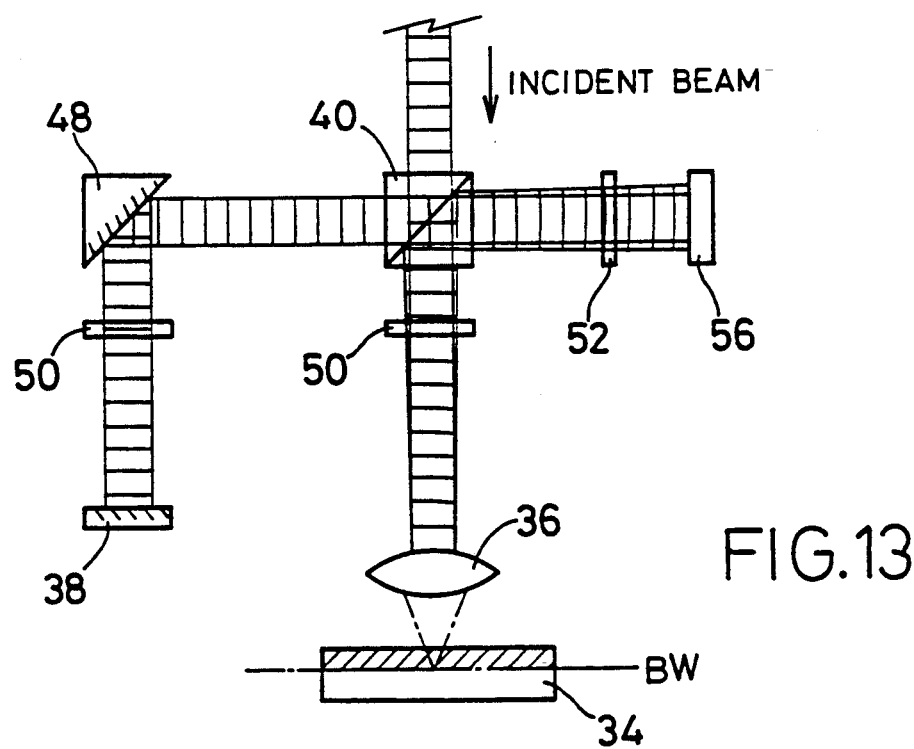
FIG. 13 is a view showing the wave condition of a beam reflected by the subject surface in the case of the incident beam as shown in FIG. 12.

The waveform of the first measuring beat beam incident upon the first measuring photosensor 56 represents a relative position between the focal point or plane of the object lens 36 and the surface of the subject 34. In other words, the surface of the subject 34 is aligned with the most constricted portion or waist position BW of the light beam which is converged by the object lens 36, as indicated in FIG. 8, the beam reflected by the subject surface has a plane wave as indicated in FIG. 9. If the surface of the subject 34 is offset from the waist position BW of the light beam in the direction away from the object lens 46, as indicated in FIG. 10, the beam reflected by the subject surface and incident upon the first measuring photosensor 56 has a converging spherical wave, as indicated in FIG. 11. On the other hand, if the subject surface is offset from the waist position BW of the incident beam in the direction toward the object lens 36, as indicated in FIG. 12, the beam reflected by the subject surface and incident upon the first measuring photosensor 56 has a diverging spherical wave, as indicated in FIG. 13.

In an optical heterodyne interference surface detecting or surface roughness measuring apparatus, there arises a measuring error if the surface of a subject to be measured is accurately aligned with the waist position or focal point of the measuring beam. That is, an amount of offset between the subject surface and the focal point of the measuring beam appears as changes in the phase of the measuring beam reflected by the subject surface, and the accuracy of measurement of the surface roughness or surface condition is adversely affected. This problem is serious particularly when the object lens 36 has a large value of magnification for measuring minute depressions and projections on the subject surface.

To avoid the above problem, the present optical heterodyne surface measuring or detecting apparatus incorporates the first heterodyne interference optical system which is adapted to position the object lens 36 with respect to the surface of the subject 34 such that the beat beam incident upon the first measuring photosensor 56 always has the plane wave. This arrangement makes it possible for the second heterodyne interference optical system to accurately measure the surface condition or roughness of the subject 34.

Referring back to FIG. 3, the reference beat signal $Sf_B$ produced by the reference photosensor 30 is shaped by a shaping circuit 104, into a pulse signal which is applied to the phase difference detecting circuit 106 and to an AND gate 110 via an inverter 108. The phase difference detecting circuit 106 also receives the measuring beat signal $Sf_{WC}$ of the photo-sensitive element 56C which has the first measuring beat frequency $f_W$. The detecting circuit 106 produces an output signal representative of a phase difference D between the reference beat signal $Sf_B$ and the measuring beat signal $Sf_{WC}$. The output signal of the circuit 106 is fed to the data bus 102. The phase difference D is called an initial phase difference Di, when the relative position between the object lens 36 and the subject 34 is initially adjusted to an optimum value that permits the beat beam incident upon the first photosensor 56 to have the plane wave, prior to starting the measurement of the surface condition of the subject 34.

The second measuring beat signal $Sf_D$ of the second measuring photosensor 68 is shaped by a shaping circuit 112, into a pulse signal, which is applied to the AND gate 110. The AND gate 110 also receives a clock signal which is generated by a high-frequency pulse generator 114 at a predetermined frequency. Each time the AND gate 110 receives the clock signal from the generator 114, the AND gate 110 determines, for example, whether the pulse of the reference beat signal $Sf_B$ of the reference photosensor 30 is absent (0) while the pulse of the second measuring beat signal $Sf_D$ of the second measuring photosensor 68 is present (1). If both of these two conditions are satisfied, the AND gate 110 produces a pulse applied to a counter 116. Thus, the count of the counter 116 corresponds to the phase difference between the reference beat signal $Sf_B$ and the second measuring beat signal $Sf_D$. The counter 116 counts the pulses from the AND gate 110 until the count reaches a value corresponding to the phase difference of $2\#$. The counter 116 produces a count-up signal and is reset when the count reaches the value indicated above. The counter 116 applies to a latch circuit 118 a signal representative of the current count (a phase difference $\phi$ smaller than $2\pi$), at a predetermined time interval. This signal is temporarily stored in the latch circuit 118, which applies to the data bus 102 a signal representative of the phase difference $\phi$ between the beat signals $Sf_B$ and $Sf_D$.

The control system includes another counter 120 which counts the count-up signals of the counter 116, each of these count-up signals being produced when the count of the counter 116 reaches the value corresponding to the phase difference $2\pi$. The counter 120 applies to a latch circuit 122 a signal representative of the count N of the count-up signals of the counter 116, at a predetermined time interval. This signal is temporarily stored in the latch circuit 122, which applies to the data bus 102 a signal representative of the count N. Thus, the phase difference $\Phi$ ($=2\pi N + \phi$) between the reference beat signal $Sf_B$ of the reference photosensor 30 and the second measuring beat signal $Sf_D$ of the second measuring photosensor 68 can be determined based on the output signal of the latch circuit 118 (which represents the phase difference $\phi$) and the output signal of the latch circuit 122 (which represents the phase difference $2\pi N$)

The control system includes a CPU (central processing unit) 124 which processes input signals according to a control program stored in a ROM (read-only memory) 128 while utilizing a temporary data storage function of a RAM (random-access memory) 126. The control system further includes an X-axis driver circuit 132 for activating the X-axis drive device 84 for the horizontally movable table 82, a lens actuator driver circuit 134 for activating the lens actuator 70 for the object lens 36, and a Z-axis driver circuit 136 for activating the Z-axis drive device 86 for the vertically movable table 88. The CPU 124 controls the Z-axis driver circuit 136 for applying a controlled drive signal to the Z-axis drive device 86 for establishing an initial position of the subject 34 with respect to the object lens 36. The CPU 124 also controls the lens actuator driver circuit 134 for applying a controlled drive signal to the lens actuator 70, so that the object lens 36 is accurately positioned relative to the initially positioned subject 34, before and during a measuring operation. The measuring operation is effected by controlling the X-axis driver circuit 132 for applying a controlled drive signal to the X-axis drive device 82, so that the subject 34 is fed along the X axis over the desired measuring range. Further, the CPU 124 processes the signals received from the latch circuits 118, 122 (which represent the phase difference $\Phi$) and the signal received from the X-position detector 138 (which represents the distance of movement of the subject 34 in the X-axis direction), so as to calculate or determine the surface condition (profile) or roughness of the subject 34. The CPU 124 controls a display 130 so as to provide a two-dimensional surface profile of the subject 34 in vertical cross section, or a three-dimensional profile of the undulated condition of the subject surface, or provide a digital or numerical indication of the surface roughness of the subject 34.

Referring next to the flow chart of FIG. 14, there will be described the operation of the control system of FIG. 3 for measuring or detecting the surface condition or roughness of the subject 34.

Initially, step S1 is executed to activate the X-axis drive device 84 to initially position the horizontally movable table 82, so that the subject 34 is moved to the X-axis position at which the measurement is started. This initial X-axis movement of the subject 34 is effected automatically upon activation of a suitable start switch.

Then, the control flow goes to step S2 in which the Z-axis drive device 86 is activated to roughly position the subject 34 in the Z-axis direction so that the surface of the subject 34 is roughly aligned with the focal point of the object lens 36 or with the waist position BW of the light beam converged by the object lens 36. Step S2 is followed by step S3 in which the lens actuator 70 is activated to move the object lens 36 along the optical axis, so that the waist position BW of the beam incident upon the surface of the subject 34 is precisely aligned with the subject surface. Steps S2 and S3 are effected, based on the output signal generated by the waveform monitoring circuit 92 so that the light beam incident upon the first measuring photosensor 56 has the plane wave. Thus, the initial relative position between the object lens 36 and the subject 34 in the direction parallel to the optical axis of the lens 36 is established. In step S3, the phase difference D detected by the phase difference detecting circuit 106 is stored as the initial phase difference Di, in the RAM 126.

In the following step S4, the X-axis drive device 84 is stepped to feed the subject 34 in the X-axis direction by a predetermined incremental distance. The control flow then goes to step S5 in which the CPU 124 determines, in synchronization with the incremental feeding of the subject 34, whether the phase difference D represented by the output signal of the phase difference detecting circuit 106 is changed from the initial phase difference Di. If a negative decision (NO) is obtained in step S5, this means that the object lens 36 need not be moved to maintain the plane wave of the light beam incident upon the first measuring photosensor 56. Namely, the height of the currently detected point on the subject surface is the same as that of the last detected point. In this case, therefore, the control flow goes to step S8, skipping steps S6 and S7. If an affirmative decision (YES) is obtained in step S5, this means that the object lens 36 should be moved along its optical axis so that the light beam reflected by the subject surface and incident upon the first measuring photosensor 56 has the plane wave. In this case, therefore, step S5 is followed by step S6 in which the lens actuator 70 is activated to move the object lens 36 so that the phase difference D is restored to the initial value Di, that is, so that the light beam incident upon the first measuring photosensor 56 has the plane wave.

It will be understood from the above description that the portion of the control system assigned to execute step S6 serves as position control means for changing the relative position between the object lens 36 and the subject 34 in the Z-axis direction (parallel to the optical axis of the lens 36), so that the light beam reflected by the subject surface has the plane wave.

Step S6 is followed by step S7 in which the distance of movement of the object lens 36 in step S6, i.e., the amount of variation in the height of the subject surface between the last and currently irradiated or detected points is calculated based on the phase difference which is determined by the reference beat signal $Sf_B$ generated by the reference photosensor 30 and the second measuring beat signal $Sf_D$ generated by the second measuring photosensor 68. The calculated movement of the object lens 36 or variation in the subject surface height is stored in the RAM 126, together with the total distance of movement of the subject 34 in the X-axis direction from the measurement start X-axis position. The total distance of movement of the subject 34 is determined by the output signal generated by the X-position detector 138.

Then, the control flow goes to step S8 in which the CPU 124 determines whether the measuring operation should be terminated or not, that is, whether the number of stepping feed movements or total distance of movement of the subject 34 in the X-axis direction has reached the predetermined value corresponding to the measurement end X-axis position. Usually, a negative decision (NO) is obtained in step S8, and steps S4–S8 are repeatedly executed. If an affirmative decision (YES) is obtained in step S8, step S9 is executed to calculate the two-dimensional cross sectional profile of the subject surface, based on the data stored in step S7, i.e., data representative of the distances of movements of the object lens 36 and data representative of the X-axis distances of the detected points on the subject surface as measured from the measurement start X-axis position. The calculated two-dimensional profile is displayed on the display 130.

As described above, the portion of the control system assigned to execute steps S7 and S9 serves as heterodyne measuring means for detecting a displacement of the lens holding sleeve 78 and thereby detecting the undulation or roughness of the surface of the subject 34, based on heterodyne interference between the light beam reflected by the stationary mirror 44, and the light beam reflected by the mirror 42 which is moved with the sleeve 78 by the lens actuator 70.

There will be described the principle of operation in step S7 to determine or calculate the distance of movement or displacement Z of the object lens 36 along the optical axis, based on the phase difference $\phi$ between the reference beat signal $Sf_B$ of the reference photosensor 30 and the second measuring beat signal $Sf_D$ of the second measuring photosensor 68. When the object lens 36 is moved at a speed Vz by the lens actuator 70, the frequency of the light beam reflected by the mirror 42 moved with the lens 36 undergoes a Doppler shift, whereby the frequency is shifted by $\Delta fm$ ($=2/\lambda \cdot Vz$) in the positive or negative direction. Accordingly, the frequency of the light beam reflected by the mirror 42 is equal to (fo+$\Delta$fm) or (fo−$\Delta$fm). This light beam is combined, at the polarizing beam splitter 46, with the light beam which is reflected by the stationary mirror 44 and which has a frequency of (fo+f1−f2). These two beams interfere with each other while passing through the polarizer 62. As a result, the second measuring beat signal $Sf_D$ produced by the second measuring photosensor 68 has a beat frequency $f_D$ which is equal to (f1−f2+Δfm) or (f1−f2−Δfm).

On the other hand, the reference beat signal $Sf_B$ produced by the reference photosensor 30 has a beat frequency $f_B$ which is equal to (f1−f2). Therefore, the interference between the reference beat signal $Sf_B$ whose beat frequency $f_B$ is (f1−f2) and the second measuring beat signal $Sf_D$ whose beat frequency $f_D$ is (f1−f2+Δfm) or (f1−f2−Δfm), a difference between the beat frequencies $f_B$ and $f_D$ is obtained from the following equation (1):

$$f_B - f_D = \Delta fm \qquad (1)$$

The frequency shift Δfm due to the Doppler shift is expressed by the following equation (2), and the Doppler frequency shift Δfm and the phase difference ΔΦ has a relationship represented by the following equation (3):

$$\Delta fm = \frac{2}{\lambda} \cdot Vz = \frac{2}{\lambda} \cdot \frac{\Delta Z}{\Delta t} \qquad (2)$$

$$\frac{1}{2\pi} \cdot \frac{\Delta \Phi}{\Delta t} = \Delta fm \qquad (3)$$

Therefore, the amount of displacement Z of the object lens 36 is expressed by the following equation (4):

$$Z = \frac{\lambda}{2} \int_0^{t^1} \Delta fm \cdot dt \qquad (4)$$

$$= \frac{\lambda}{2} \int_0^{t^1} \frac{1}{2\pi} \cdot \frac{\Delta \Phi}{\Delta t} \cdot dt$$

$$= \frac{\lambda}{2} \cdot \frac{1}{2\pi} [\Phi(t = t^1) - \Phi(t = 0)]$$

Thus, by detecting the phase difference Φ, it is possible to detect or measure the displacement Z of the object lens 36, i.e., the amount of variation of the height of the surface of the subject 36 at the currently measured X-axis position from the height at the last measured X-axis position. In other words, the undulation or roughness or height variation of the surface of the subject 34 is represented by the phase differences 101 which are detected at the individual spaced-apart measuring X-axis positions on the subject surface irradiated by the light beam converged by the object lens 36.

In the heterodyne interference surface measuring or detecting apparatus according to the present embodiment of the invention constructed and operated as described above, the first heterodyne interference optical system including the subject 34, object lens 36, mirror 38, beam splitter 40 and first measuring photosensor 56 is adapted to position the object lens by the lens actuator 70 with respect to the subject 34 so as to establish the initial phase difference Di so that the light beam which is reflected by the subject surface and received by the first measuring photosensor 56 has the plane wave, namely, so that the waist position BW of the light beam converged by the object lens 36 is held aligned with the surface of the subject 34. In other words, the first heterodyne interference optical system is used to establish the optimum relative position between the object lens 36 and the subject 34, for precise alignment of the focal point of the object lens 36 with the subject surface, when a measurement is made at each X-axis position. The amount of displacement Z of the object lens 36 or lens holding sleeve 78 is detected by the reference photosensor 30, and the second heterodyne interference optical system which includes the mirrors 42, 44, beam splitter 46 and second measuring photosensor 68. Thus, the present apparatus is capable of effecting accurate measurement of the surface undulation or roughness of the subject 34 in the order of angstroms. Each time the subject 34 is fed to each measuring position (step S4), that is, each time the height of the subject surface is changed due to the undulation, the phase difference Φ is first detected (step S6), and then the object lens 36 is positioned so that the waist position BW of the light beam converged by the lens 36 is aligned with the relevant measuring spot of the subject surface (step S6). The displacement Z of the lens 60 is detected based on the phase difference (step S7). Thus, the apparatus assures improved measuring resolution in the X-axis direction (parallel to the subject surface). Further, the positioning of the object lens 36 at each measuring position as described above makes it possible to accurately measure the height variation of the subject surface, even if the height variation due to the surface deflection or undulation or presence of grooves or pits in the surface is larger than the wavelength of the measuring light beam which irradiates the measuring spots at the measuring X-axis positions on the subject surface.

Another embodiment of the present invention will be described by reference to FIG. 15, which shows a modified waveform monitoring circuit used in place of the circuit 92 of FIG. 4. In the preceding embodiment, the phase differences of the beat signals $Sf_{WB}$ and $Sf_{WD}$ of the photo-sensitive elements 56B and 56D with respect to the beat signal $Sf_{WC}$ of the photo-sensitive element 56C are used to determine whether the light beam received by the second measuring photosensor 56 has the plane wave or not. In the present modified embodiment employing the waveform monitoring circuit of FIG. 15, however, the determination is effected based on the intensities or amplitudes of the second measuring beat signals $Sf_{WB}$, $Sf_{WC}$ and $Sf_{WD}$. Described more specifically, the beat signals $Sf_{WB}$, $Sf_{WC}$ and $Sf_{WD}$ generated by the respective photo-sensitive elements are received by respective amplitude/voltage converters 142B, 142C and 142D, which produce voltage signals representative of voltages corresponding to the amplitudes or intensities of the received beat signals. These voltage signals are applied to respective analog/digital converters 144B, 144C and 144D, which convert the voltage signals into corresponding digital signals. The digital signals produced by the converters 144B and 144C are applied to a first dividing circuit 146, while the digital signals produced by the converters 144B and 144D are applied to a second dividing circuit 148. The first dividing circuit 146 produces an output signal representative of a ratio of the amplitude of the beat signal $Sf_{WB}$ of the upper photo-sensitive element 56B to that of the beat signal $Sf_{WC}$ of the central photo-sensitive element 56C. On the other hand, the second dividing circuit 148 produces an output signal representative of an amplitude ratio of the beat signal $Sf_{WD}$ of the lower photo-sensitive element 56D to that of the beat signal $Sf_{WC}$. These output signals of the circuits 146, 148 are applied to a comparator circuit 150, which determines whether a ratio of the two amplitude ratios represented by the received signals falls within a predetermined reference range. If the ratio falls within the predetermined reference range, the circuit 150 produces an output signal indicating that the light beam incident upon the second photosensor 56 has the plane wave. If the ratio is smaller than the lower limit of the reference range, the circuit 150 produces an output signal indicating that the light beam has the converging spherical wave. If the ratio is larger than the upper limit of the reference range, the circuit 150 produces an output signal indicating that the light beam has the diverging spherical wave. The output signal of the comparator circuit 150 is applied to the data bus 102 as shown in FIG. 3. The upper and lower limits of the reference range are determined based on the Gaussian distribution of the amplitude of the beat signals $Sf_W$ of the photosensor 56 in the plane perpendicular to the optical axis of the photosensor when the light beam incident upon the photosensor has the plane wave. That is, the center of the reference range corresponds to the center of the Gaussian distribution, and the upper and lower limits are determined to be suitable values larger and smaller than the center.

Figure 16:
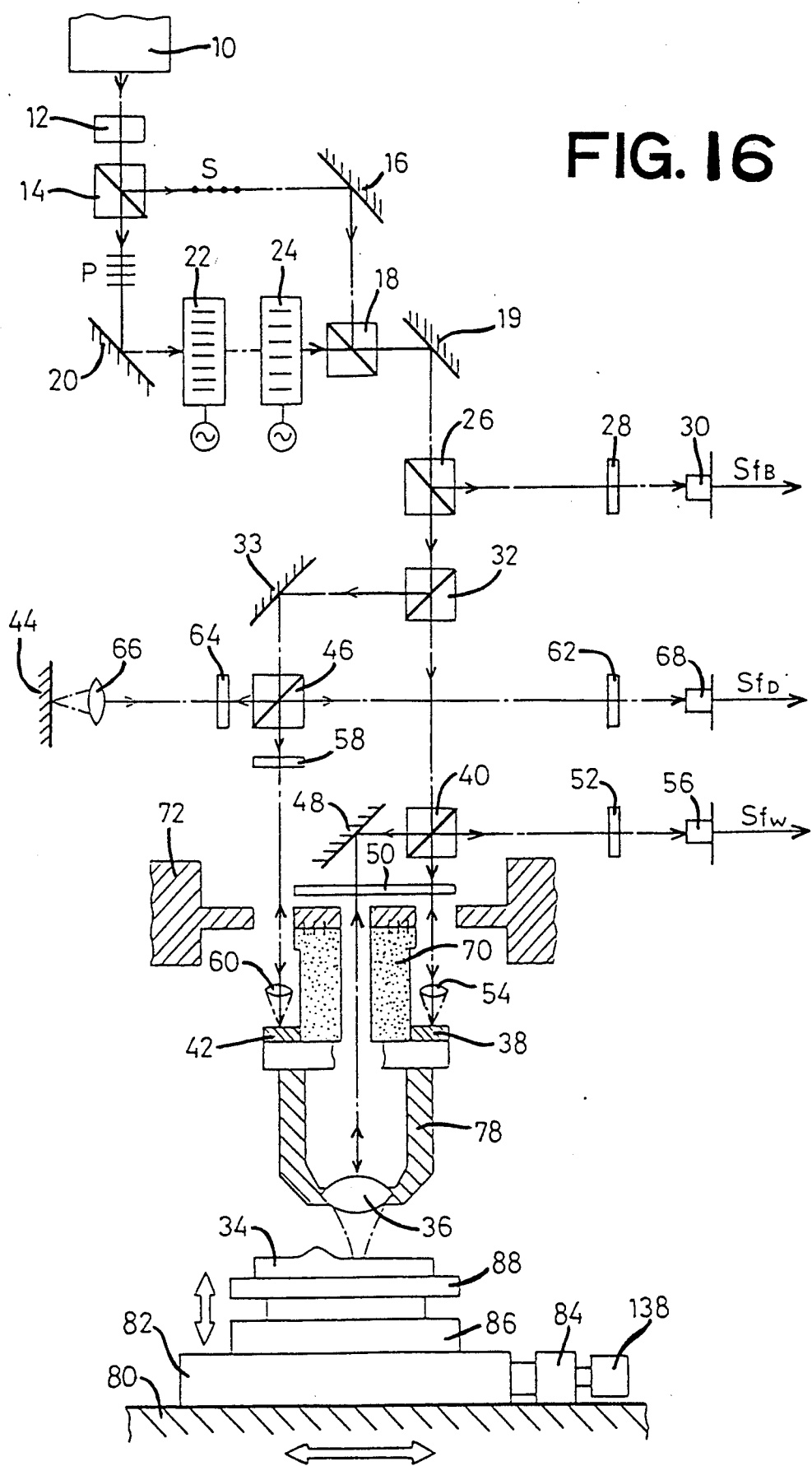
FIG. 16 is a view corresponding to that of FIG. 1, showing a further embodiment of the invention.

The principle of the present invention is also applicable to an apparatus having an optical arrangement as shown in FIG. 16. In the first embodiment of FIG. 1, the first heterodyne interference optical system is adapted such that the P type polarized beam transmitted through the polarizing beam splitter 40 is incident upon and reflected by the surface of the subject 34, while the S type polarized beam reflected by the beam splitter 40 is reflected by the mirror 38. In the modified embodiment of FIG. 16, the P type polarized beam transmitted through the beam splitter 40 is reflected by the mirror 38 while the S type polarized beam reflected by the beam splitter 40 is incident upon and reflected by the subject 34. In this case, the frequency fo of the S type polarized beam remains unchanged, while the frequency of the P type polarized beam is changed to fo +f1 −f2 due to the Doppler shift.

While the present invention has been described in its presently preferred embodiments, for illustrative purpose only, it is to be understood that the invention may be otherwise embodied.

Figure 15:
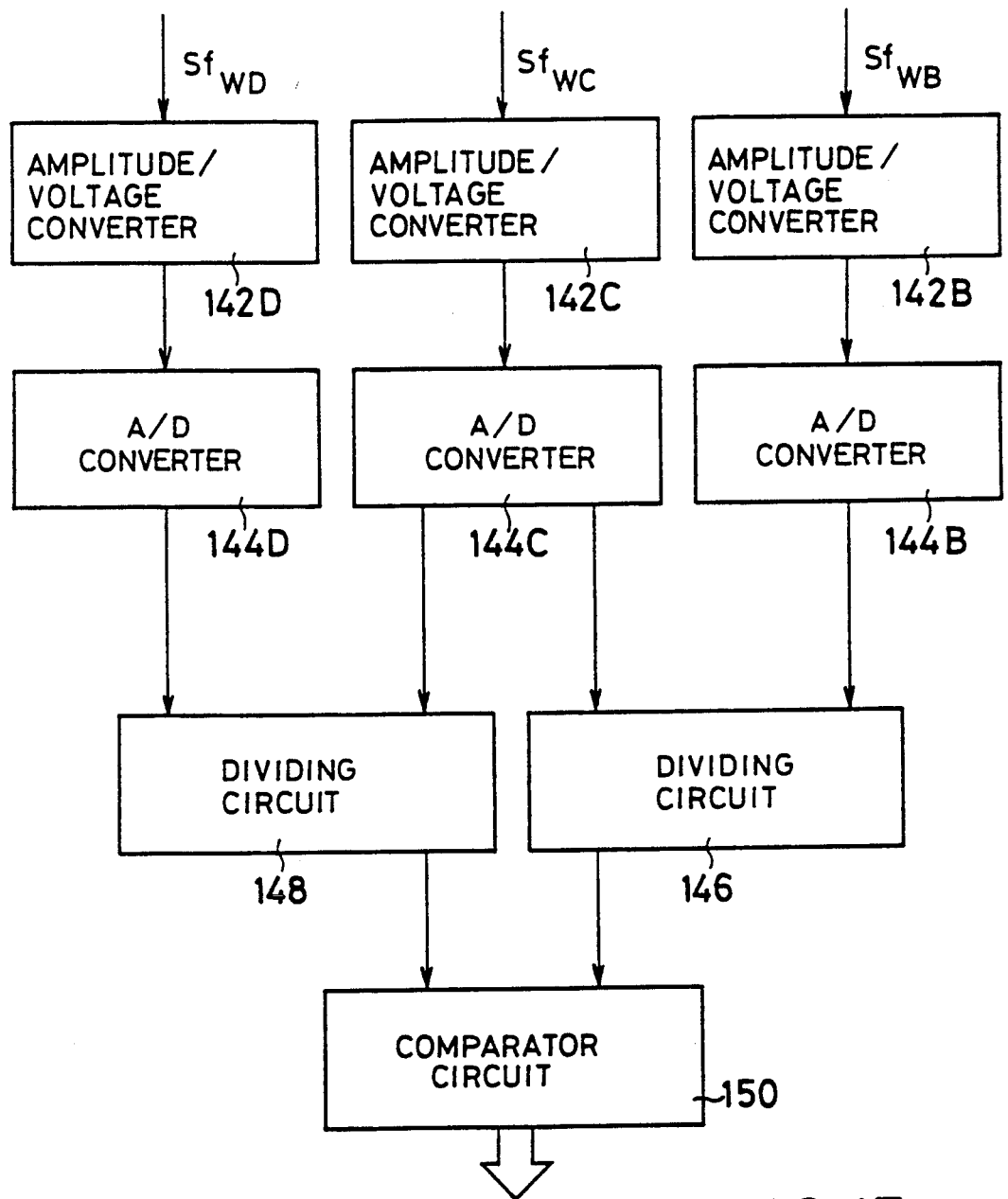
FIG. 15 is a view corresponding to that of FIG. 4, showing another embodiment of the present invention.

In the waveform monitoring circuits shown on FIGS. 4 and 15, the second measuring beat signals $Sf_{WB}$, $Sf_{WC}$ and $Sf_{WD}$ of the photo-sensitive elements 56B, 56C and 56D arranged in the vertical row are used to make the determination of the plane wave of the light beam incident upon the second measuring photosensor 56. However, the same determination may be made based on the beat signals $Sf_{WA}$, $Sf_{WC}$ and $Sf_{WE}$ of the photo-sensitive elements 56A, 56C and 56E arranged in the horizontal row as shown in FIG. 2. Although the embodiment of FIG. 15 uses the three beat signals $Sf_{WB}$, $Sf_{WC}$ and $Sf_{WD}$ are used, it is possible to use the two beat signals which are arranged in the vertical or horizontal row and which includes the beat signal $Sf_{WC}$ of the central photo-sensitive element 56C.

While the illustrated embodiments use the photosensor 56 which includes the five photo-sensitive elements 56A–56E as shown in FIG. 2, the photosensor 56 may be replaced by a CCD (charge-coupled device) wherein photo-sensitive elements (electrodes) are arranged in a straight row. If a CCD is used in the embodiment of FIG. 15, the determination as to whether the Gaussian distribution is established or not may be more accurately and reliably accomplished.

In the illustrated embodiments, the position of the object lens 36 is finely adjusted in the direction parallel to the optical axis by the lens actuator 70 secured to the frame 72, while the vertical position of the subject 34 is roughly adjusted by the Z-axis drive device 86 mounted on the horizontally movable table 82. However, the Z-axis drive device 86 or the vertically movable table 88 may be provided with a suitable actuator such as a piezoelectric actuator for fine adjustment of the vertical position of the the lens actuator 70 may be eliminated. Further, the Z-axis drive device 86 may be eliminated if the operating stroke of the lens actuator 70 is sufficient to make a required adjustment of the relative vertical position between the object lens 36 and the subject 34.

Figure 3:
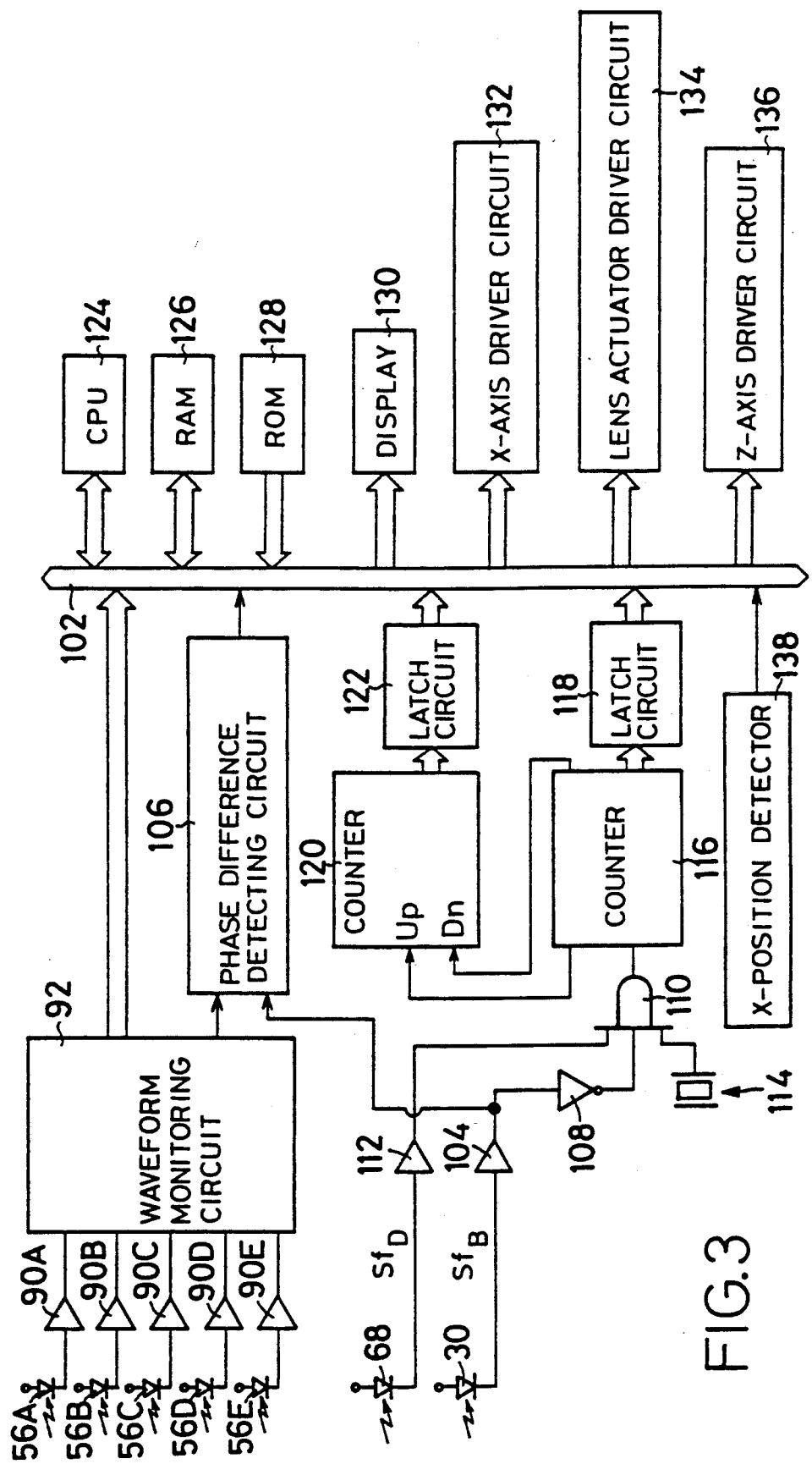
FIG. 3 is a schematic block diagram illustrating a control system of the measuring apparatus of FIG. 1.

A part or all of the waveform monitoring circuit 92, phase difference detecting circuit 106, counters 116, 120 and latch circuits 118, 122 of the control system of FIG. 3 may be constituted by a computer.

The illustrated embodiments are adapted to provide a two-dimensional display of the surface undulation or roughness of the subject 34 in the form of a cross sectional profile in the X-Z plane, which is obtained by incrementally feeding or stepping the subject 34 in the X-axis direction. However, the apparatus may be provided with a Y-axis drive device for feeding the subject 34 in the Y-axis direction perpendicular to the X and Z axes, so that the subject 34 is fed in the Y-axis direction after each movement in the X-axis direction. In this case, the apparatus may provide a three-dimensional display of the surface condition.

Figure 14:
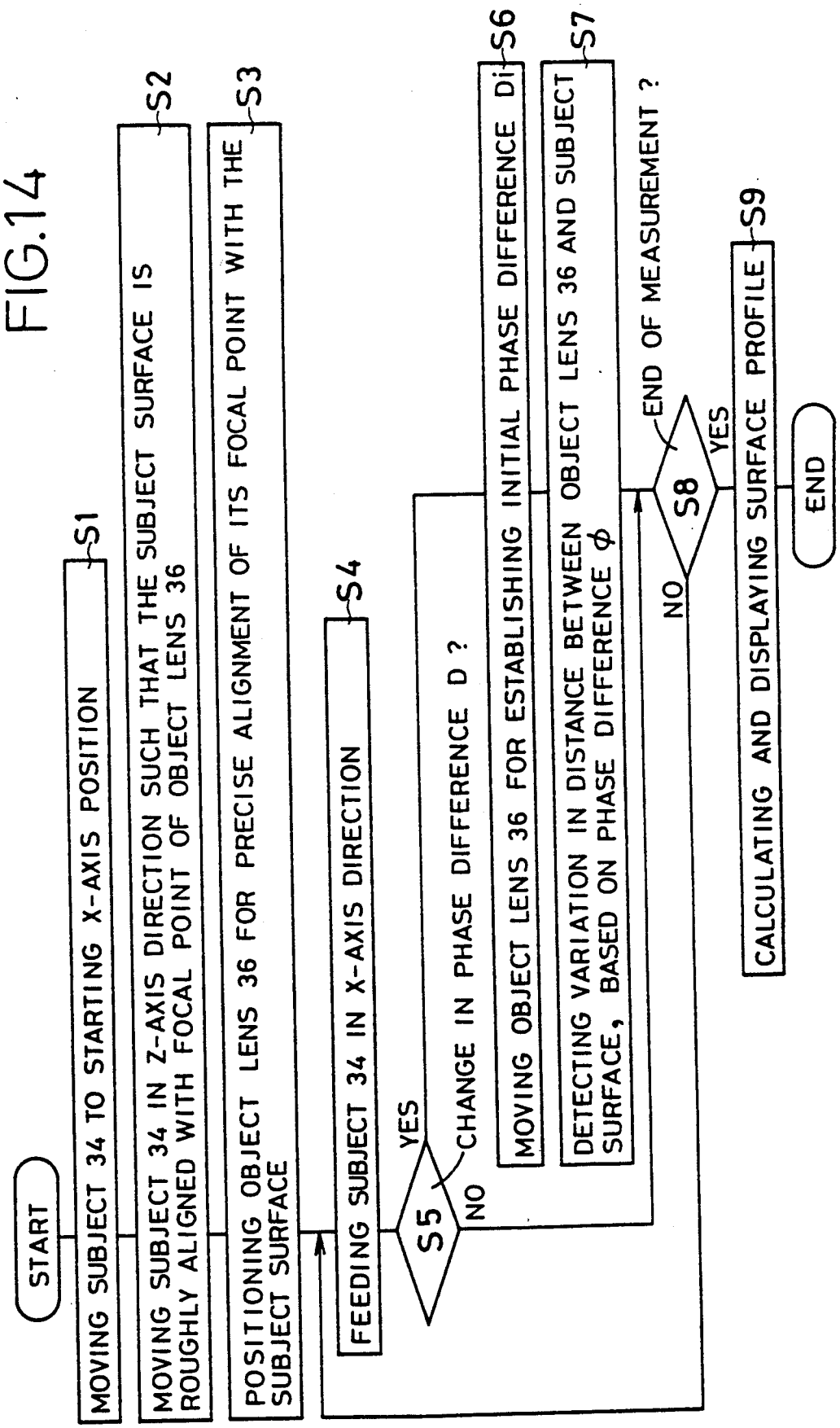
FIG. 14 is a flow chart illustrating an operation of the control system of FIG. 3.

In step S6 of the flow chart in FIG. 14, the object lens 36 is positioned so that the phase difference D detected by the phase difference detecting circuit 106 coincides with the initial phase difference Di. However, the object lens 36 may be positioned so that the waveform monitoring circuit 92 produces a signal indicating that the light beam incident upon the second measuring photosensor 56 has the plane wave.

It will be understood that the invention may be embodied with various other changes, modifications and improvements, which may occur to those skilled in the art, without departing from the spirit and scope of the invention defined in the following claims.

What is claimed is:

1. A method of detecting a condition of a surface of a subject by using a light beam which is converged on the surface of the subject by an object lens and which is reflected by the subject surface, comprising the steps of:

controlling a relative position between said object lens and said subject in a direction parallel to an optical axis of said object lens, so that said light beam reflected by said subject surface has a plane wave; and detecting an amount of relative displacement between said object lens and said subject surface, based on a heterodyne interference between a light beam reflected by a stationary mirror and a light beam reflected by a movable mirror which is moved as said relative position is changed, whereby said condition of the subject surface is detected based on the detected amount of relative displacement between said object lens and said subject surface.

2. A method according to claim 1, wherein said step of controlling a relative position between said object lens and said subject comprises providing a lens actuator secured to a frame and supporting said object lens, and activating said lens actuator for moving said object lens relative to said subject in said direction parallel to the optical axis of said object lens.

3. A method according to claim 1, wherein said step of controlling a relative position between said object lens and said subject comprises:

preparing a composite light as a first measuring beat beam consisting of a light beam which has a first frequency and which is incident upon said subject surface through said object lens and reflected by said subject surface, and a light beam which has an initial second frequency different from said first frequency and which is reflected by another movable mirror which is moved as said relative position between said object lens and said subject is changed;

providing a first measuring photosensor which has a plurality of photo-sensitive elements which are arranged in a direction perpendicular to a direction of incidence of said first measuring beat beam upon said photosensor;

directing said first measuring beat beam such that said first measuring beat beam is incident upon said plurality of photo-sensitive elements of said first measuring photosensor;

determining, based on output signals of said photo-sensitive elements, whether said light beam reflected by said subject surface has said plane wave, or a converging or diverging spherical wave; and changing said relative position between said object lens and said subject until said output signals indicate that said light beam reflected by said subject surface has said plane wave.

4. A method according to claim 3, wherein said step of determining whether said light beam reflected by said subject surface has said plane wave, or a converging or diverging spherical wave, comprises:

detecting a first phase difference between a pair of said output signals of said photo-sensitive elements, and a second phase difference between another pair of said output signals, and detecting a difference between said first and second phase differences; and determining whether said difference between said first and second phase differences falls within a predetermined reference range, or not, and thereby determining whether said light beam reflected by said subject surface has said plane wave, or not.

5. A method according to claim 3, wherein said step of detecting an amount of relative displacement between said object lens and said subject surface comprises:

preparing a composite light as a second measuring beat beam consisting of said light beam which is reflected by said stationary mirror and which has a third frequency, and said light beam which is reflected by said movable mirror recited in claim 1 and which has an initial fourth frequency different from said third frequency;

preparing a reference beat beam which is a composite beam consisting of two beams having said third and fourth frequencies; and detecting said amount of relative displacement, based on said second measuring beat beam and said reference beat beam.

6. A method according to claim 1, wherein said step of detecting an amount of relative displacement between said object lens and said subject surface comprises incrementally feeding said subject in a direction parallel to said subject surface, and detecting said amount of relative displacement at each of measuring positions which are spaced apart from each other in said direction parallel to said subject surface.

7. An optical heterodyne surface measuring apparatus for detecting a condition of a surface of a subject, by using a light beam which is converged on the surface of the subject by an object lens and which is reflected by the subject surface, comprising:

a drive device for changing a relative position between said object lens and said subject in a direction parallel to an optical axis of said object lens;

position control means for controlling said drive device for changing said relative position between said object lens and said subject, so that said light beam reflected by said subject surface has a plane wave; and heterodyne measuring means for detecting an amount of relative displacement between said object lens and said subject surface, based on a heterodyne interference between a light beam reflected by a stationary reflecting member and a light beam reflected by a movable reflecting member which is moved as said relative position is changed by said drive device under the control of said position control means, said heterodyne measuring device detecting said condition of said subject surface, based on the detected amount of relative displacement between said object lens and said subject surface.

8. An optical heterodyne surface measuring apparatus according to claim 7, wherein said drive device comprises a lens actuator secured to a frame and supporting said object lens, said actuator including a piezoelectric member which is displaceable in the direction parallel to said optical axis to move said object lens relative to said subject.

9. An optical heterodyne surface measuring apparatus according to claim 7, further comprising a light source device for producing a composite light consisting of two beams having respective first and second different frequencies, and a beam splitter for splitting said composite light into a first light beam and a second light beam, and wherein said heterodyne measuring means comprises a first heterodyne interference optical system which includes another movable reflecting member which is moved as said relative position between said object lens and said subject surface is changed, a first measuring photosensor which has a plurality of photo-sensitive elements which are arranged in a direction perpendicular to an optical axis of said first measuring photosensor, and a waveform monitoring circuit, said first heterodyne interference optical system receiving said first light beam and producing a composite light as a first measuring beat beam which consists of a light beam which has an initial frequency equal too said first frequency and which is incident upon said subject surface through said object lens and reflected by said subject surface, and a light beam which has said second frequency and which is reflected by said another movable reflecting member, said photo-sensitive elements of said first measuring photosensor receiving said first measuring beat beam and producing output signals, said waveform monitoring circuit receiving said output signals and determining, based on the output signals, whether said light beam reflected by said subject surface has said plane wave, or a converging or diverging spherical wave.

10. An optical heterodyne surface measuring apparatus according to claim 9, wherein said position control means changes said relative position between said object lens and said subject until said waveform monitoring circuit determines that said light beam reflected by said subject surface has said plane wave.

11. An optical heterodyne surface measuring apparatus according to claim 9, wherein said waveform monitoring circuit comprises:
   a first phase difference detecting circuit which receives a pair of said output signals of said photosensitive elements of said first measuring photosensor, to detect a first phase difference between said pair of said output signals;
   a second phase difference detecting circuit which receives another pair of said output signals, to detect a second phase difference between said another pair of said output signals;
   a subtracter for detecting a difference between said first and second phase differences; and
   a comparator circuit for determining whether said difference between said first and second phase differences falls within a predetermined reference range, or not, and thereby determining whether said light beam reflected by said subject surface has said plane wave, or not.

12. An optical heterodyne surface measuring apparatus according to claim 9, wherein said heterodyne measuring means comprises a second heterodyne interference optical system having said stationary reflecting member, said movable reflecting member, said movable reflecting member, a second measuring photosensor, a reference photosensor, and means for preparing a reference beat beam,
   said second heterodyne interference optical system receiving said second light beam and producing a composite light as a second measuring beat beam which consists of said light beam which is reflected by said stationary reflecting member and which has a third frequency, and said light beam which is reflected by said movable reflecting member and which has a fourth initial frequency different from said third frequency,
   said reference beat beam being a composite beam consisting of two beams having said first and second frequencies,
   said second measuring photosensor receiving said second measuring beat beam and producing a measuring beat signal, while said reference photosensor receiving said reference beat beam and producing a reference beat signal, said amount of relative displacement between said object lens and said subject surface being detected based on said measuring beat signal and said reference beat signal.

13. An optical heterodyne surface measuring apparatus according to claim 7, further comprising a feeding device for incrementally feeding said subject in a direction parallel too said subject surface, and wherein said heterodyne measuring means detects said amount of relative displacement at each of measuring positions which are spaced apart from each other in said direction parallel to said subject surface.

* * * * *